«12» United States Patent
Kurtze et al.

(10) Patent No.: US 6,360,737 B1
(45) Date of Patent: Mar. 26, 2002

(54) ANNULAR SAW AND METHOD OF PROTECTING THE CLAMPING EDGE AND OF CLEANING THE SAW BLADE OF AN ANNULAR SAW

(75) Inventors: Wolf-Rüdiger Kurtze, Burghausen (DE); Leopold Neussl, Neukirchen (AT); Peter Lehfeld, Burghausen (DE)

(73) Assignee: Wacker Siltronic Gesellschaft für Halbleitermaterialien AG, Burghausen (DE)

( * ) Notice: Subject to any disclaimer, the term of this patent is extended or adjusted under 35 U.S.C. 154(b) by 0 days.

(21) Appl. No.: 09/500,317

(22) Filed: Feb. 8, 2000

(30) Foreign Application Priority Data

Feb. 11, 1999 (DE) .......................... 199 05 750

(51) Int. Cl.⁷ ............................................... B28D 1/02
(52) U.S. Cl. ...................................... 125/12; 125/13.02
(58) Field of Search ................................ 125/12, 13.01, 125/13.02, 20

(56) References Cited

U.S. PATENT DOCUMENTS

| 3,556,074 A | * | 1/1971 | Nelke .......................... 125/15 |
| 3,827,421 A | * | 8/1974 | Schumacher et al. .......... 125/15 |
| 3,955,551 A | * | 5/1976 | Tang ............................. 125/15 |
| 4,135,499 A | * | 1/1979 | Schumacher .................. 125/15 |
| 4,209,005 A | * | 6/1980 | Tremeau ..................... 125/13 R |
| 4,771,759 A | * | 9/1988 | Zoebeli ....................... 125/13 R |
| 5,111,622 A | * | 5/1992 | Steere, Jr. ..................... 51/5 C |
| 5,185,956 A | * | 2/1993 | Steere, Jr. ..................... 51/5 C |
| 5,235,960 A | * | 8/1993 | Malcok .................... 125/13.02 |
| 5,303,687 A | * | 4/1994 | Steere ...................... 125/13.02 |
| 5,351,446 A | * | 10/1994 | Langsdorf ................. 125/13.02 |
| 5,667,423 A | * | 9/1997 | Itoi ................................ 451/5 |
| 5,832,914 A | * | 11/1998 | Aydelott ................... 125/13.02 |
| 5,902,171 A | * | 5/1999 | Hamasaki et al. .............. 451/5 |

FOREIGN PATENT DOCUMENTS

EP  464668  2/1994

OTHER PUBLICATIONS

The English Derwent Abstract AN 1992–008674[02] Corresp. to EP464668 is enclosed.

* cited by examiner

*Primary Examiner*—Derris H. Banks
*Assistant Examiner*—Hadi Shakeri
(74) *Attorney, Agent, or Firm*—Collard & Roe, P.C.

(57) ABSTRACT

There is an annular or internal-diameter saw and a method of protecting the clamping edge and of cleaning the saw blade of this annular or internal-diameter saw. The annular or internal-diameter saw has an element which partly screens the clamping edge and is arranged in the vicinity of the clamping edge and the saw blade, and has an outer material layer on the clamping edge. The outer material layer faces the element and is substantially harder than a clamping edge material lying behind it. The method is distinguished by the fact that workpiece residues thrown against the clamping edge are shattered when striking the clamping edge. This is due to the fact that an element partly screening the clamping edge is provided in the vicinity of the clamping edge and the saw blade. Also, the clamping edge is given high strength by virtue of the fact that an outer material layer on the clamping edge facing the element is produced from a material which is substantially harder than a clamping edge material lying behind it.

7 Claims, 1 Drawing Sheet

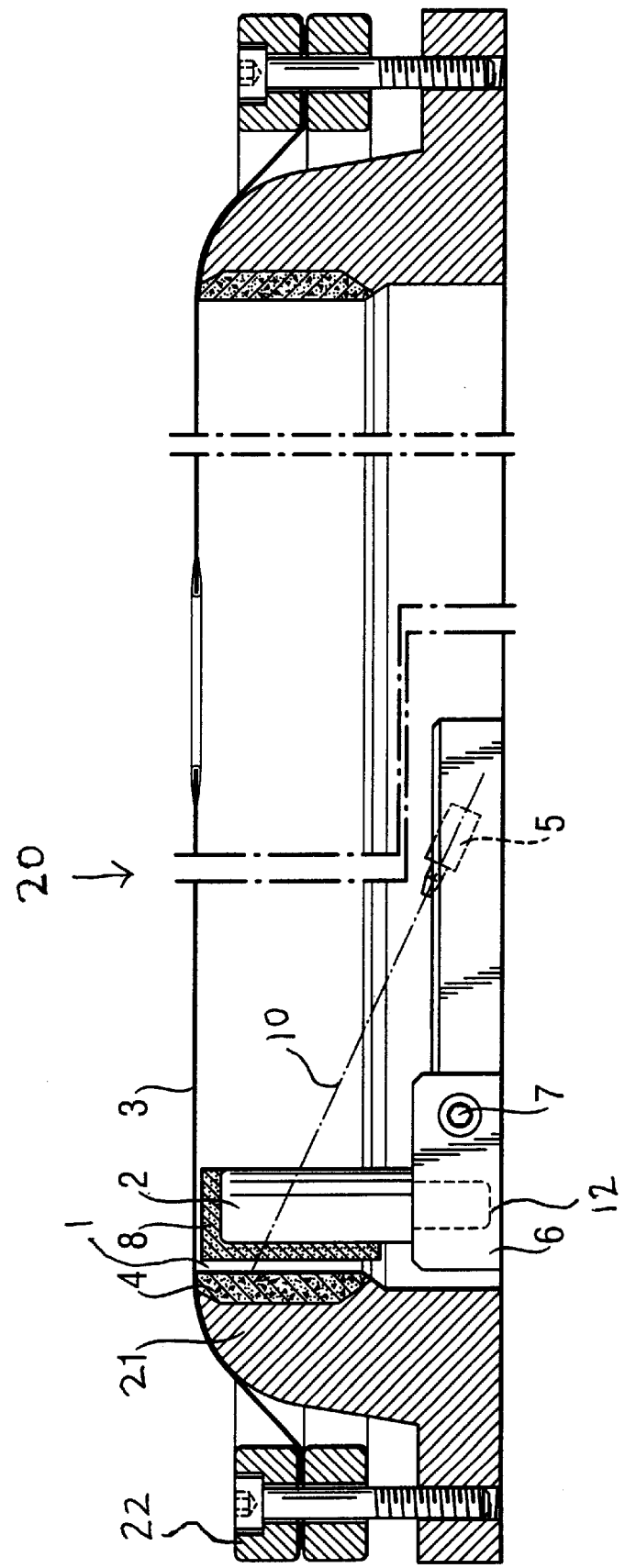

ANNULAR SAW AND METHOD OF PROTECTING THE CLAMPING EDGE AND OF CLEANING THE SAW BLADE OF AN ANNULAR SAW

BACKGROUND OF THE INVENTION

1. Field of the Invention

The present invention is directed to an annular or internal-diameter saw for cutting off wafers from a workpiece, comprising a saw blade which is clamped via a clamping edge of a clamping edge ring. In addition, the present invention is also directed to a method of protecting the clamping edge and of cleaning the saw blade of an annular or internal-diameter saw during the cutting off of wafers from a workpiece.

2. The Prior Art

EP-464 668 A1 describes the basic construction, the mode of operation and a common field of use of annular or internal-diameter saws.

During the cutting off of wafers from a workpiece by means of an annular or internal-diameter saw, a wafer or wafer residues may be thrown radially against the clamping edge of the saw blade clamping system. This results in high wear of the clamping edge. In addition, wafers to be cut off subsequently may be damaged or destroyed by a wafer or wafer residues adhering to the saw blade.

It is therefore advantageous to keep that side of the saw blade on which a wafer is obtained during the cutting off operation free from a wafer or wafer residues. Thus the liquid jet of a cleaning agent may be moved radially back and forth over the side of the saw blade when the saw blade is rotating. If this is not successful, the saw blade, outside the field of view of the operator, may be cleaned. For example, the cleaning may be done with a brush having a long handle, by the brush hairs being pressed against the saw blade at the same time as the flushing with water is occurring. In this case, however, wafers or wafer residues, called workpiece residues below, may be drawn onto the saw blade by a water film. The adhesion forces may be so strong that the saw spindle has to be switched off and the workpiece residues have to be removed by hand.

An undamaged clamping edge is necessary for optimum clamping of the saw blade and for retaining the clamping of the saw blade during the cutting off of wafers. It is also necessary for keeping undesirable axial deflection movements of the saw blade, which are directed perpendicularly to the cutting direction, as small as possible.

SUMMARY OF THE INVENTION

It is an object of the present invention to avoid awkward handling methods for cleaning the saw blade and at the same time to provide improved protection of the clamping edge from workpiece residues which have been thrown off.

The present invention provides a component of an annular or internal-diameter saw for cutting off wafers from a workpiece, comprising a saw blade which is clamped via a clamping edge of a clamping edge ring, the annular or internal-diameter saw having an element which partly screens the clamping edge and is arranged in the vicinity of the clamping edge and the saw blade, and an outer material layer on the clamping edge, the outer material layer facing the element and being designed to be substantially harder than a clamping edge material located behind it.

The present invention is also directed to a method of protecting the clamping edge and of cleaning the saw blade of an annular or internal-diameter saw during the cutting off of wafers from a workpiece, wherein workpiece residues thrown against the clamping edge are shattered when striking the clamping edge by virtue of the fact that an element partly screening the clamping edge is provided in the vicinity of the clamping edge and the saw blade, and the clamping edge is given high strength by virtue of the fact that an outer material layer on the clamping edge facing the element is produced from a material which is substantially harder than a clamping edge material located behind it.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

The invention is explain in more detail below with reference to the drawing FIGURE. This FIGURE shows the essential features of the invention in schematic representation. The drawing specifically shows a cross-section view of an annual saw component with a clamping edge ring.

DETAILED DESCRIPTION OF PREFERRED EMBODIMENTS

Turning now in detail to the drawings, the clamping edge 1 is part of a clamping edge ring 21, which in turn belongs to a clamping system. This is conventional practice in this technology and is described, for example, in EP-464 668 A1.

The present invention includes an element 2 which partly screens the clamping edge, is arranged in the vicinity of the clamping edge 1 and is also at only a slight distance from the saw blade 3. The distance of the element 2 from the clamping edge is preferably 0.1 to 0.5 mm, in particular preferably 0.1 to 0.2 mm. The distance of the element 2 from the saw blade 3 is preferably less than the thickness of a wafer to be cut off, in particular preferably 0.1 to 0.2 mm. The element 2 is preferably designed as a pin or peg and is made of a hard material or is encased within a casing of such a material. The preferred material is a carbide (HW/K10/DIN 513). The reference numeral 8 in the drawing refers to this casing, which may be a carbide casing. Annular saw component 20 includes clamping ring 22.

A further unique feature of the present invention relates to an outer material layer 4 of the clamping edge 1 which faces the element 2. The material layer 4 has the property of being substantially harder than clamping edge materials normally used, such as, for example, VAx steel (stainless austenitic steel). A material layer of "Stellit 6" (material number 2.3177 or DIN 8555:MF 20-40-CZT or ASTM/AWS:E Co Cr-A) has proved to be especially suitable. This material layer 4 is joined to conventional clamping edge ring material, preferably welded onto the clamping edge ring material. The geometry of the clamping edge, despite a very high mechanical stress, is retained for a very long time due to the reinforcement of the clamping edge with the material layer.

In other words, the clamping edge 1 is made of a material having a first hardness. The outer material layer 4 has a second hardness which is substantially greater than the first hardness.

During the operation of the annular or internal-diameter saw having the features described, workpiece residues are projected by centrifugal forces against the clamping edge 1. However, the clamping edge is protected from wear by the especially hard material layer 4. In addition, the workpiece residues are shattered by the element 2 when striking the clamping edge, in the course of which the workpiece residues are cleaned from the saw blade 3. To assist in the cleaning of the saw blade, conventional flushing nozzles may be used which are directed toward the saw blade and deliver a liquid jet.

In another embodiment of the invention, the shattered workpiece residues are flushed continuously or cyclically from the clamping edge 1, and thus the clamping edge is also cleaned in this process. To this end, a flushing nozzle 5 is preferably provided, which directs a liquid jet 10 past the element 2 to the clamping edge. It is also especially preferred to provide a block 6, which is fastened to a machine part of the annular or internal-diameter saw which does not move. For example it may be fastened to the bearing stator or to the machine frame, by a fastening means 7. Block 6 is provided with receptacles 12, which hold the element 2 and the flushing nozzle 5 in the intended position. It has proved to be optimal if a water jet delivered from the flushing nozzle 5 strikes the clamping edge directly in front of the element 2 approximately 15 mm below the saw blade. In this case, the saw blade and the clamping edge remain virtually free of contamination during the cutting off of wafers.

The present invention has the advantages that uneven operation of the machine (unbalance) due to the build-up of contamination can be reliably eliminated. Also inconvenient interventions by operating personnel are avoided, so that the risk of injury associated with such interventions is eliminated. In addition, forced machine downtime will rarely occur.

Accordingly, while a few embodiments of the present invention have been shown and described, it is to be understood that many changes and modifications may be made thereunto without departing from the spirit and scope of the invention as defined in the appended claims.

What is claimed is:

1. An annular saw component for cutting off wafers from a workpiece, comprising
    a clamping edge ring having a clamping edge;
    a saw blade which is clamped by said clamping edge of said clamping edge ring;
    said clamping edge being made of material having a first hardness;
    a pin which partly screens the clamping edge and which is arranged adjacent to the clamping edge and the saw blade;
    a nozzle which projects a liquid jet past the pin to the clamping edge;
    a block which fixes the pin and the nozzle in an established position; and
    an outer material layer on the clamping edge, said outer material layer facing the pin and having a second hardness substantially greater than the first hardness of the clamping edge material located behind it.

2. The annular saw component as claimed in claim 1, wherein a distance between the pin and the clamping edge is 0.1 to 0.5 mm.

3. The annular saw component as claimed in claim 1, wherein a distance between the pin and the saw blade is less than a thickness of a wafer to be cut off.

4. The annular saw component as claimed in claim 1, wherein the outer material layer is welded onto the material located behind it.

5. A method of protecting a clamping edge of an annular saw component during the cutting off of wafers from a workpiece, comprising
    causing workpiece residues to be thrown against the clamping edge; said clamping edge made of a material having a first hardness;
    providing an element partly screening the clamping edge adjacent to the clamping edge and a saw blade;
    providing the clamping edge with high strength by having an outer material layer on the clamping edge facing the element; said outer material layer having a second hardness which is substantially greater than the first hardness of the clamping edge material located behind it; and
    shattering said residues when striking the clamping edge.

6. The method as claimed in claim 5, comprising welding the outer material layer onto the material located behind it.

7. The method as claimed in claim 5, comprising removing workpiece residues, after striking the clamping edge, from the clamping edge by flushing with a liquid.

* * * * *